April 8, 1952
W. R. HOPKINS
2,592,284
MEANS FOR CONTROLLING COMBUSTION
OF INTERNAL-COMBUSTION ENGINES
Filed Nov. 9, 1946
6 Sheets-Sheet 1
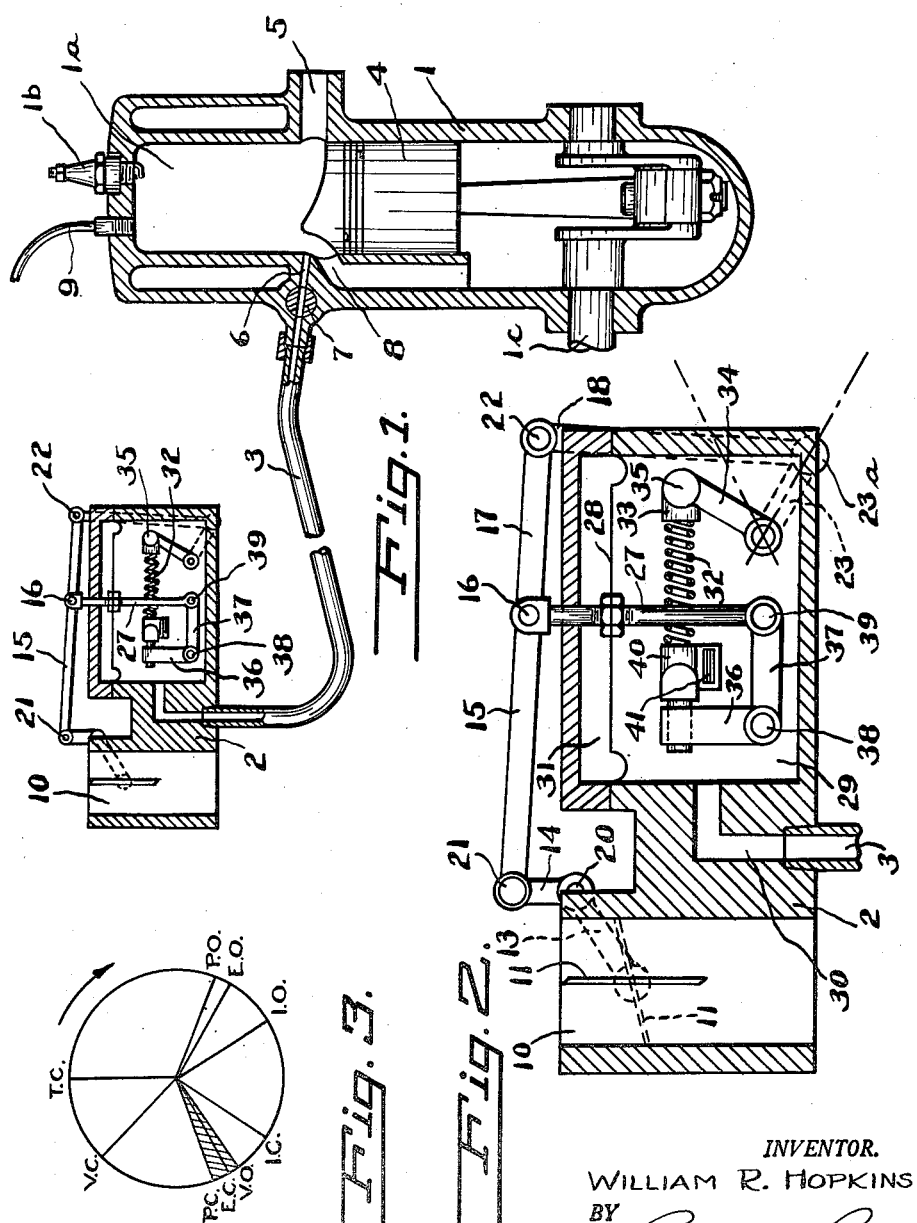
INVENTOR.
WILLIAM R. HOPKINS
BY
Raymond A. Paquin
ATTORNEY.

April 8, 1952 W. R. HOPKINS 2,592,284
MEANS FOR CONTROLLING COMBUSTION
OF INTERNAL-COMBUSTION ENGINES
Filed Nov. 9, 1946 6 Sheets-Sheet 2

INVENTOR.
WILLIAM R. HOPKINS
BY
Raymond A. Paquin
ATTORNEY.

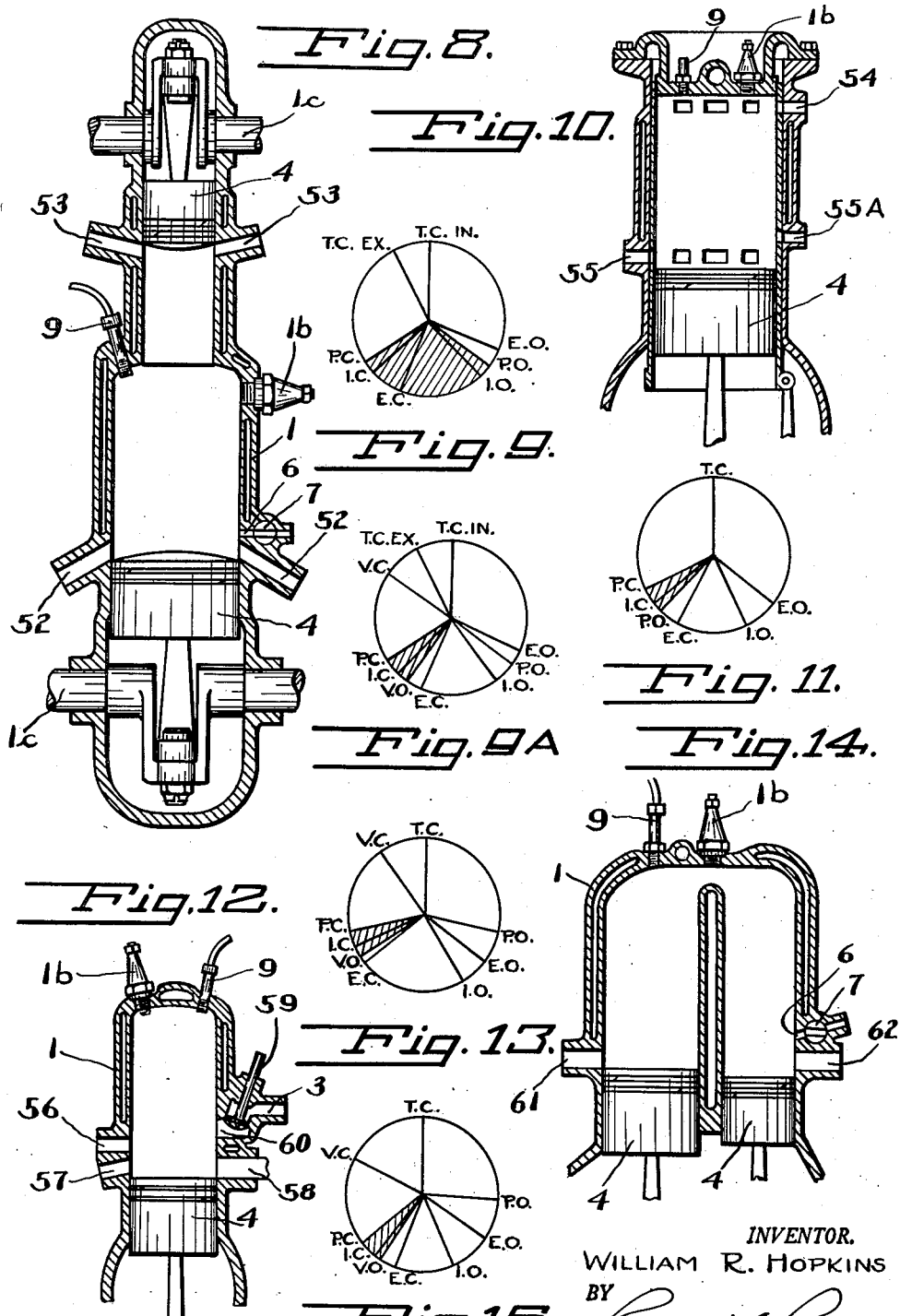

INVENTOR.
WILLIAM R. HOPKINS
BY
Raymond A. Paquin
ATTORNEY.

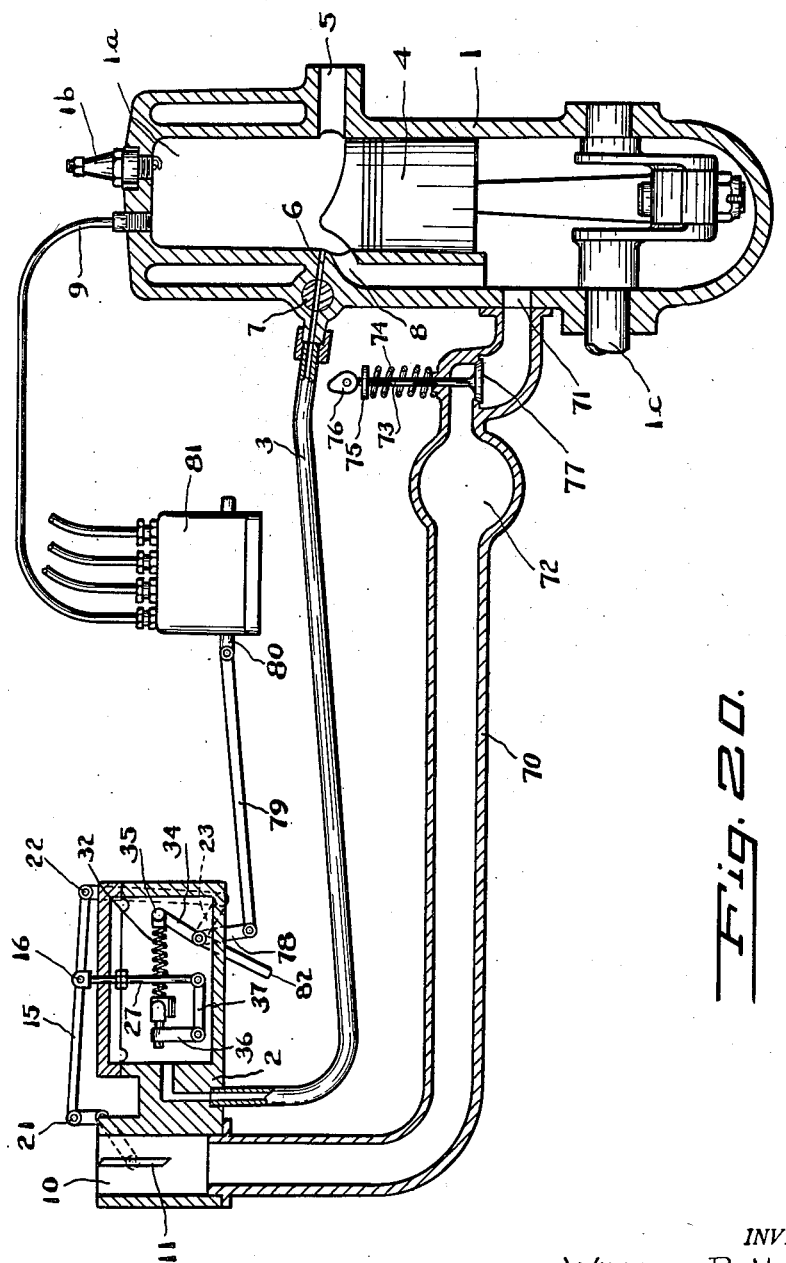

Patented Apr. 8, 1952

2,592,284

UNITED STATES PATENT OFFICE 2,592,284

MEANS FOR CONTROLLING COMBUSTION OF INTERNAL-COMBUSTION ENGINES

William R. Hopkins, North Wilbraham, Mass., assignor to American Bosch Corporation, Springfield, Mass., a corporation of New York Application November 9, 1946, Serial No. 709,057

6 Claims. (Cl. 123—32)

This invention relates to a new and improved means for controlling the ratio of fuel and air supplied to the combustion chamber of an internal combustion engine or the like and more particularly to such a means wherein the ratio of fuel and air supplied is more accurately controlled.

An object of the invention is to provide new and improved means wherein the ratio of fuel and air supplied to the combustion chamber is automatically controlled according to the quantity of air in the combustion chamber.

Another object of the invention is to provide new and improved means whereby the ratio of air and fuel supplied to the combustion chamber is controlled by the quantity of air in the combustion chamber at a point in the compression stroke after the air charge has been trapped in the combustion chamber.

Another object of the invention is to provide new and improved means for controlling the ratio of the air and fuel supplied the combustion chamber whereby an indication of the air pressure hence quantity in the combustion chamber is communicated to the mixture control which automatically controls the ratio of the air and fuel supplied according to said indication.

Another object of the invention is to provide a new and improved mixture control which is adapted to receive an indication of the air pressure hence quantity in the combustion chamber and to automatically control the ratio of air and fuel supplied said combustion chamber according to said indication.

Another object of the invention is to provide a new and improved means and apparatus of the type set forth whereby it is possible to obtain an indication of the pressure in the combustion chamber at a point in the compression stroke after the air charge has been trapped in the combustion chamber and whereby the ratio of fuel and air supplied to said combustion chamber is automatically controlled according to the indicated pressure.

Other objects and advantages of the invention will be apparent from the following description taken in connection with the accompanying drawings. It will be understood that many changes may be made in the details of construction and arrangement of parts shown, without departing from the spirit of the invention as expressed in the accompanying claims, as the preferred form of invention have been given by way of illustration only.

Referring to the drawings:

Fig. 1 is a diagrammatic view of an engine cylinder and mixture control constructed according to the invention;

Fig. 2 is a diagrammatic view of the mixture control apparatus shown in Fig. 1 but on an enlarged scale;

Fig. 3 is a timing diagram for the apparatus shown in Fig. 1;

Fig. 8 is a diagrammatic view showing the invention applied to another form of engine;

Fig. 9 is a timing diagram for the form of invention shown in Fig. 8 but not embodying the sampling valve;

Fig. 9A is a timing diagram for the type of engine shown in Fig. 8 and embodying the sampling valve;

Fig. 10 is a diagrammatic view showing the invention applied to a sleeve valve type engine;

Fig. 11 is a timing diagram for the form of invention shown in Fig. 10;

Fig. 12 is a diagrammatic view showing a slightly modified form of the invention;

Fig. 13 is a timing diagram for the form of invention shown in Fig. 12;

Fig. 14 is a diagrammatic view showing the invention applied to a twin cylinder engine;

Fig. 15 is a timing diagram for the form of invention shown in Fig. 14;

Fig. 20 is a fragmentary schematic view of an engine embodying the invention.

Figure 6:
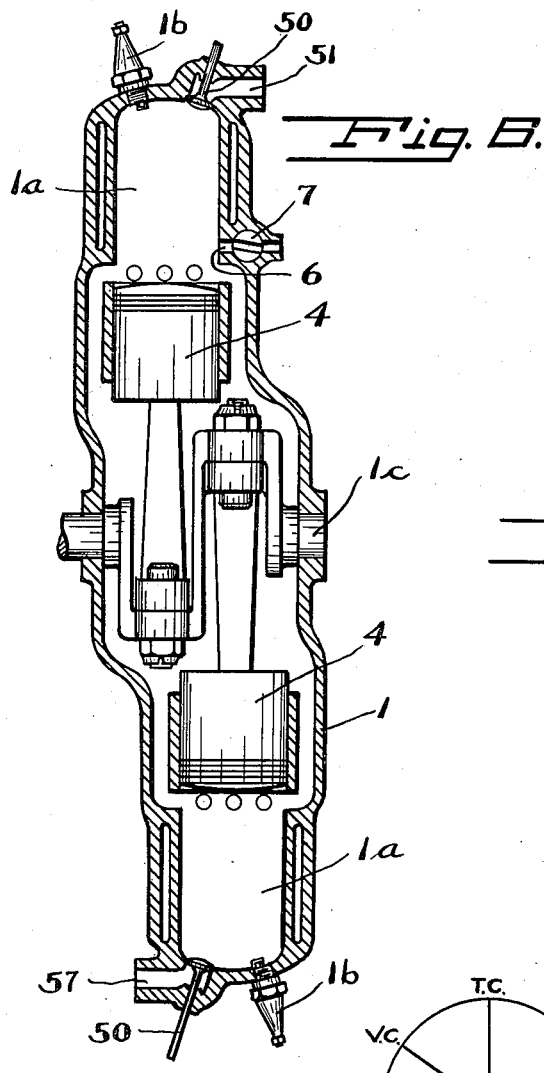
Fig. 6 is a diagrammatic view showing the invention applied to an opposed cylinder type engine.

In prior type internal combustion devices employing manifold pressure operated mixture controls for controlling the ratio of fuel and air supplied to the combustion chamber, it has been usual to control the ratio of fuel and air so that the amount of fuel was proportionate to the amount of air passing through the manifold control to the combustion chamber. While such air would reach the combustion chamber, due to the fact that the exhaust port in the combustion chamber was open when the air entered the combustion chamber, a quantity of the air was lost through the exhaust port which, in many instances, was a considerable amount of the air reaching the combustion chamber and, therefore, when the fuel charge was proportioned to all of the air passing to the combustion chamber, the ratio of the air and fuel charges in the chamber was not such as to provide most efficient operation of the device.

According to the present invention, wherein this difficulty is overcome, means are provided whereby the quantity of air trapped during each cycle of the piston in the cylinder is indicated in the mixture control apparatus and the ratio of the fuel and air charges supplied to the combustion chamber is controlled thereby. This sampling pressure or indicating pressure replaces the manifold pressure in the mixture control, where the manifold type mixture control is employed, and thus indicates in the mixture control the air quantity in the cylinder at a definite point in the compression stroke, that is, after the ports are closed and the piston is starting on its compression stroke, and the quantity of fuel supplied to the combustion chamber is automatically controlled by this sampling pressure and, therefore, the fuel charge is controlled by the quantity of air actually in the combustion chamber and not the quantity of air which has passed into the combustion chamber or which is believed theoretically to be in the combustion chamber and thus there is automatically provided more accurately controlled air and fuel ratios and thus insuring a more accurate and efficient combustion mixture.

For the purpose of illustrating the invention, there is shown applications of the invention to various types of two stroke cycle engines, but these are shown only for the purpose of illustrating the invention and are not intended to limit the invention to the types shown nor to two stroke cycle engines.

It is pointed out that where the valves have been shown in the head of the cylinder, that other conventional valve and head arrangements may be equally applicable and also that the invention is applicable to liquid cooled wet sleeve cylinders as shown and to all other type cylinders whether liquid, vapor or air-cooled.

In the drawings a poppet or rotary type sampling valve is shown and it will be understood that any suitable type valve is equally applicable including poppet, rotary, piston, sleeve or other suitable types, and also where the sampling ports having sampling valves are shown, it will be understood that said ports may be located in any position in the cylinder above the position of the piston when the inlet to the combustion chamber is closed.

Referring more particularly to the drawings wherein similar reference characters designate corresponding parts throughout the several views, the form of the invention shown in Fig. 1 comprises the cylinder 1 of the base compression type and the mixture control apparatus 2 which are connected by the pipe line or the like 3 as hereinafter described. The cylinder 1 contains the piston 4, of conventional type, and is provided with the exhaust port 5. The cylinder 1 is also provided with the sampling port 6 and the rotary sampling valve 7 and the air inlet 8.

The cylinder 1 is also provided with the combustion chamber 1a adapted to receive fuel through the fuel line 9 from the fuel injection pump and which is adapted to be ignited by the spark plug 1b.

The rotary sampling valve 7 is adapted to be aligned with the sampling port 6 as shown in Fig. 1 to allow air to pass through said port 6, then through the passageway in the sampling valve 7 to the pipe line 3 from which it passes to the mixture control 2 as shown, and the rotary sampling valve 7 is adapted to be operatively connected to the crankshaft 1c or other suitable portions of the engine for opening and closing said rotary sampling valve 7 whereby the combustion chamber 1a and the interior of the mixture control 2 may be in communication with each other, thus allowing an indication of the air pressure hence quantity in the combustion chamber to be communicated to the mixture control at a definite point in the compression stroke, that is, after the ports are closed and the piston 4 is starting on its compression stroke. This indication of the air pressure or quantity in the combustion chamber which is communicated to the mixture control may be utilized to automatically control the ratio of the fuel and air supplied to the combustion chamber as hereinafter described.

The mixture control apparatus which is shown diagrammatically in Figs. 1 and 2 and more specifically in Figs. 16 to 19 inclusive is illustrative of the forms of mixture control apparatus that may be employed with the sampling means described above for more accurately controlling the ratio of the fuel and air charges supplied to the combustion chamber.

This mixture control comprises the air passageways 10 in which are pivotally mounted the butterfly valve flies 11 on the rotatable shaft 12 which is adapted to be rotated through the movement of the lever 13 and link 14 which are actuated by the lever 15.

The lever 15 is pivotally mounted on the fulcrum 16 and is connected through the portion 17 of lever 15 and link 18 to the pump control shaft 19 for controlling the fuel injection pump.

The lever 13 and link 14 are pivotally connected at 20, the link 14 and lever 15 are pivotally connected at 21; the portion 17 of lever 15 and link 18 are pivotally connected at 22 and the link 18 and lever 23 are pivotally connected at 23a whereby pivotal movement of the lever 15 about the fulcrum 16 will cause pivotal movement of the throttle flies 11 to open or close the throttle passageways 10.

The fulcrum 16 comprises the member 24 which is pivotally mounted on the pivots 25 and which is pivotally connected at 26 to the vertical shaft 27 to which is connected the diaphragm 28 which is adapted to actuate said fulcrum 16 as hereinafter described to change the location of said fulcrum and thus open or close the flies 11 in the air passages 10.

The mixture control member 2 contains the chamber 29 which is connected by means of the passageway 30 to the tube 3 adapted to communicate with the combustion chamber 1a through the sampling valve 7 and sampling port 6 so that the air pressure within the engine cylinder or combustion chamber 1a is communicated to the chamber 29 in the mixture control 2 and adapted to actuate the diaphragm 28 against the atmospheric pressure in the chamber 31 on the side of said diaphragm opposite said chamber 29 and thus actuate the fulcrum 16 to change the position of the flies 11.

Within the chamber 29 in the mixture control 2 is the calibrated spring 32 which bears at one end against the member 33 which is pivotally mounted on lever 34 at 35. The L-shaped lever having the arms 36 and 37 is pivoted at 38 and the arm 37 has its free end pivotally connected to the lower end of the shaft 27 at 39. The spring 32 has its opposite end engaging the member 40 which is provided with the thermostatic or bimetallic strip 41 for temperature compensation and is adapted to shorten the spring lever arm 36 with increased temperature by lowering the member 40. The temperature compensator is adapted to be actuated by inlet manifold air temperature.

Figure 17:
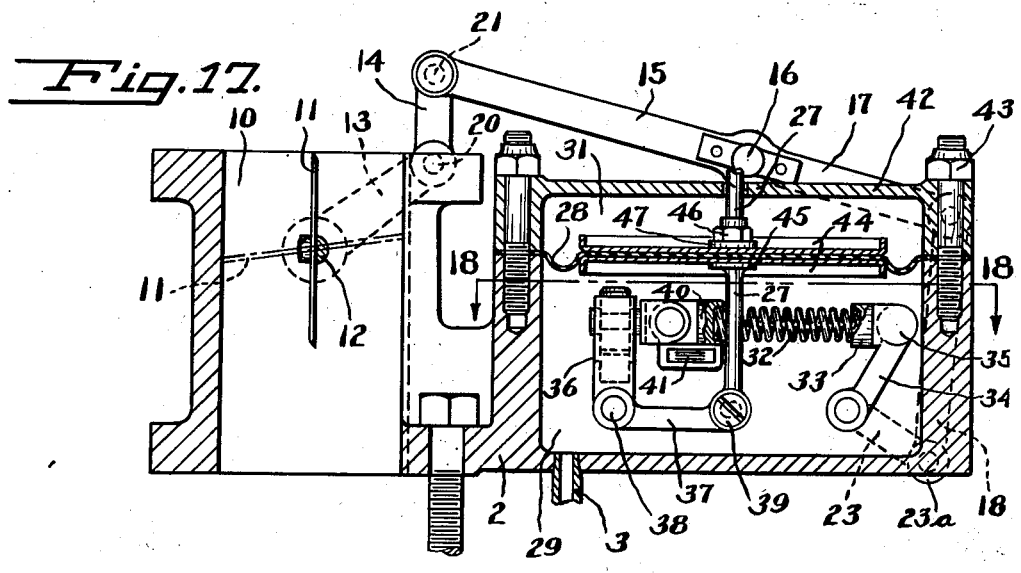
Fig. 17 is a sectional view taken along line 17—17 of Fig. 16 looking in the direction of the arrows.
Figure 18:
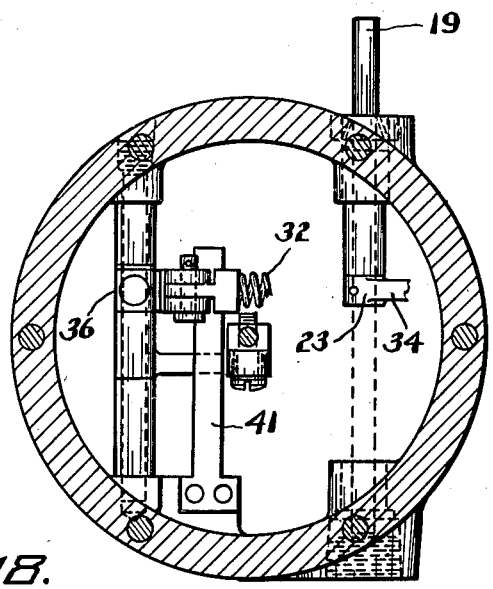
Fig. 18 is a sectional view taken on line 18—18 of Fig. 17 looking in the direction of the arrows.
Figure 19:
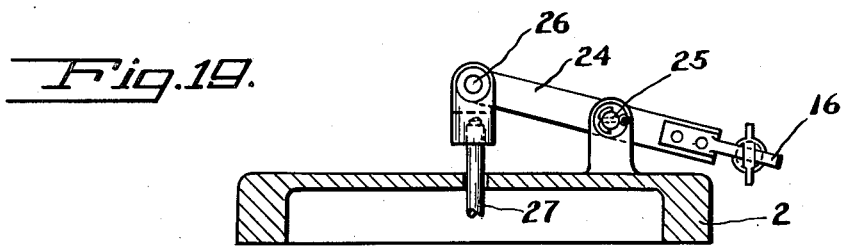
Fig. 19 is a fragmentary side view taken along line 19—19 of Fig. 16 looking in the direction of the arrows.

The head 42 is secured to the body 2 of the mixture control by means of the bolts or the like 43 which also secure the edges of the diaphragm 28 as shown in Fig. 17. The disc shaped plates 44 are provided on either side of the diaphragm 28 and are retained on the shaft 27 between the flange 45 and nut 46 with a washer 47 positioned between the nut 46 and the adjacent plate 44.

In the form of the invention shown in Fig. 1, the sampling arrangement has been shown applied to a base compression, cylinder port inlet and exhaust, cross scavenged form of two stroke cycle internal combustion engine as previously described, and Fig. 3 indicates a timing diagram for this form of the invention. In Fig. 3, T.C. indicates the top center, P.O. indicates the sampling port opening, E.O. indicates exhaust port opening, I.O. indicates inlet port opening, I.C. indicates inlet port closing, V.O. indicates the sampling valve opening, E.C. indicates exhaust port closing, P.C. indicates the sampling port closing and V.C. indicates the sampling valve closing.

In this form of the invention the rotary sampling valve 7, which rotates at one-half or one times the crankshaft speed, is opened between the V.O. and V.C. indications on the timing diagram, however, the passage is only opened between V.O. and P.C., because of the closing of the port 6 by the piston 4, which is the portion of the timing diagram which has been cross sectioned.

In the form of the invention shown in Fig. 4, there is provided the poppet type sampling valve 48 adapted to open and close the sampling passage 49 which is adapted to be connected to the line 3 as described in connection with the form of the invention shown in Fig. 1.

Figure 4:
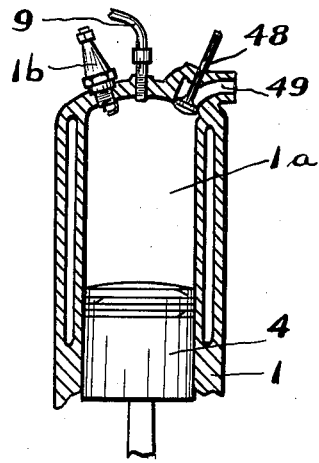
Fig. 4 is a view showing a slightly modified form of the invention having poppet type inlet and exhaust valves.
Figure 5:
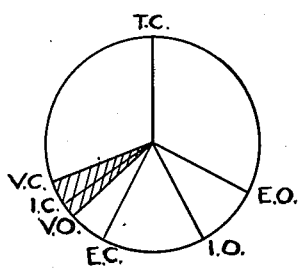
Fig. 5 is a timing diagram for the form of invention shown in Fig. 4.

The timing diagram in Fig. 5 relates to the form of the invention shown in Fig. 4.

Figure 7:
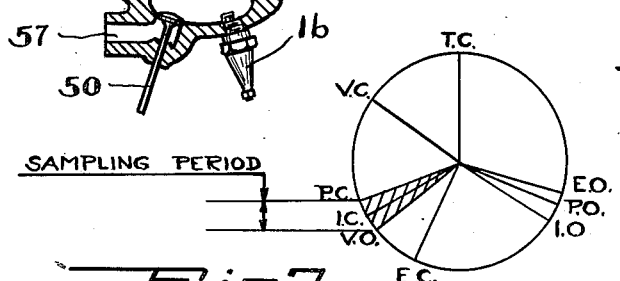
Fig. 7 is a timing diagram for the construction shown in Fig. 5.
Figure 16:
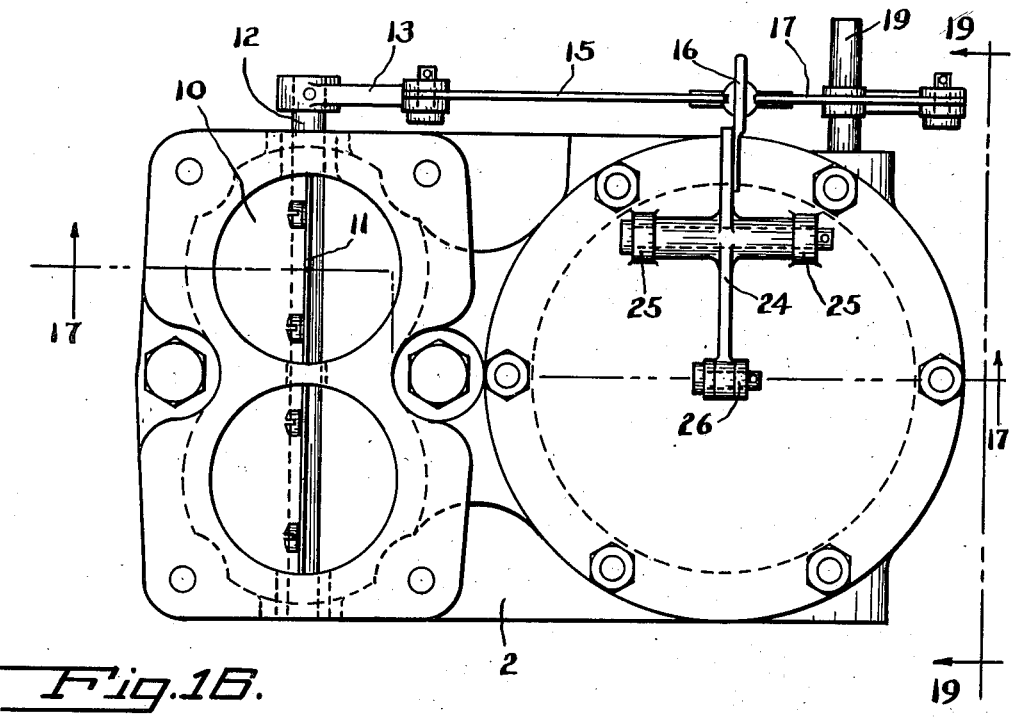
Fig. 16 is a top or plan view showing a mixture control apparatus for use in carrying out the method of the invention.

In Fig. 6 is shown a base compression, cylinder port inlet and poppet exhaust form of the invention, and in Fig. 7 is shown a timing diagram for the form of the invention shown in Fig. 6. In this form of the invention the poppet valves 50 control the exhaust ports 51.

In Fig. 8 is shown an opposed piston form of the invention of the uniflow type wherein the cylinder bores may be equal or in any desired ratio. In this form of invention the cylinder 1 is provided with the inlets 52 and the exhaust ports 53. This construction, as well as the construction of Fig. 6, includes the rotary sampling valve 7 and sampling port 6 as described in connection with the form of the invention shown in Fig. 1. Fig. 9 illustrates a timing diagram for the construction shown in Fig. 8 without the sampling valve 7, and the timing diagram shown in Fig. 9A is for this same construction employing said sampling valve 7 and sampling port 6.

In Fig. 10 is illustrated a sleeve type valve of the reciprocating and oscillating type which construction is provided with the exhaust port 54, inlet port 55 and sampling port 55A which is connected to the line 3 to the mixture control as described in connection with the form shown in Fig. 1. As shown in Fig. 10, this construction is also provided with the intake 55. In Fig. 11 is shown a timing diagram for the construction of Fig. 10 employing the sampling device of the invention.

In Fig. 12 is shown a dual inlet construction having the charging port 56, scavenging port 57, exhaust port 58 and the poppet type sampling valve 59 controlling the sampling port 60 adapted to be connected to a line 3 to the mixture control as shown in the form of the invention in Fig. 1. In Fig. 13 is shown a timing diagram for the form of the invention shown in Fig. 12.

In Fig. 14 is shown the invention applied to a twin-cylinder engine which has the inlet 61 and exhaust 62 but which includes the rotary type sampling valve 7 and the sampling port 6 as previously described in connection with the form of the invention shown in Fig. 1. In this construction the cylinder bores may be equal or in any desired ratio.

In Fig. 15 is shown a timing diagram for the construction of Fig. 14.

In the above figures an attempt has been made to show the adaptation of the arrangement for providing a sampling pressure in the mixture control for automatically controlling the ratio of the fuel and air supplied the engine cylinder or combustion chamber. While it has been shown in most cases to be applied to a single cylinder of the engine, it will be understood that such sampling means might be employed in only one cylinder of the engine or in each cylinder thereof as desired.

In the operation of the construction shown in Fig. 1, air enters the combustion chamber through the inlet port 8 and some of this air passes through the cylinder and is exhausted through the exhaust port 5 until the exhaust port 5 and inlet port 8 are closed by the piston 4 at which time the rotary sampling valve 7 is rotated into alignment with the sampling port 3 and allows the passage of air pressure from the combustion chamber 1a to pass through the line 3 to the mixture control 2 to indicate in the mixture control the air pressure in the combustion chamber 1 to thereby automatically control the ratio of fuel and air supplied said combustion chamber. This control is adjusted for temperature or density by the bimetallic element 41. The rotary sampling valve 7 is rotated to close the sampling port 6 during the further stroke of the piston 4.

The same principle applies to the operation of the sampling means to the other forms of the invention shown and in all cases there is transmitted from the combustion chamber or engine cylinder to the mixture control an indication or sampling pressure of the actual pressure in the combustion chamber, which indication or sampling pressure is utilized to automatically control the ratio of the air and fuel supplied to the combustion chamber.

In each case the timing diagrams have been hatched or shaded to indicate the time during which the sampling valve is open to allow communication between the interior of the cylinder and the interior of the mixture control.

In Fig. 20 there is shown schematically one cylinder of an engine, which can be one or more cylinders as desired, the fuel injection pump and mixture control.

In this construction the air induction pipe 70 connects the air throttle 10 with the engine crankcase through the port 71 from manifold 72 which is common to all of the engine cylinders.

In port 71 is provided intake valve 77 which is carried by valve stem 73 and is adapted to be retained in closed position, as shown, by coil spring 74 which engages spring seat 75. Cam 76 which is operated by the engine crankshaft is adapted to open said valve upon each rotation of said cam 76.

The fuel injection pump 81 is connected with mixture control 2 through the links 78 and 79 which is connected to the pump control rack 80 for adjusting the fuel quantity delivered by the pump. The mixture control unit 2 is provided with the control lever 82 for adjusting the fuel quantity delivered by the pump.

In operation the control lever 82 on the mixture control 2 is set to provide the quantity of fuel necessary for desired engine operation and compress spring 32 to provide the corresponding air pressure in the engine cylinder for correct combustion.

Butterfly valve 11 is operated by a combination of the load in spring 32 and the pressure received in the mixture control from the engine cylinder through sampling valve 7 and line 3 and acting on diaphragm 28.

The intake valve 77 operates to supply air to the engine crankcase in the usual manner for a two cycle engine.

The rotary sampling valve 7 is opened at a definite point in the compression stroke to allow air to pass from the interior of the engine cylinder through line 3 to the mixture control 2. The point at which the valve 7 is opened is after the ports are closed and preferably when the piston is starting on its compression stroke. The air reaching the mixture control 2 from the engine cylinder reaches the chamber 29 in the mixture control 2 and actuates the diaphragm 28 against the atmospheric pressure in chamber 31 in said mixture control 2 on the side of the diaphragm 28 opposite the chamber 29. Movement of the diaphragm 28 actuates the fulcrum 16 and thus changes the location of said fulcrum thereby opening or closing the flies 11 in the air passages 10. The air then supplied to the engine cylinder or combustion chamber is thus the correct amount to give proper combustion. If desired, instead of the control of the air supply, a mixture control which adjusted the fuel quantity instead of the air quantity, could be employed.

From the foregoing it will be seen that I have provided simple, efficient and economical means for obtaining all of the objects and advantages of the invention.

Having described my invention, I claim:

1. In a device of the character described, a mixture control for controlling the ratio of air and fuel supplied to an engine cylinder, a fuel injection pump for supplying fuel to said engine cylinder, means for controlling the air supplied to said engine cylinder, an air passage connecting said mixture control and said engine cylinder and adapted to permit passage of air from said cylinder to said mixture control at a point in the compression stroke whereby an indication of the air pressure in the engine cylinder at a point in the compression stroke may be transmitted to said mixture control, said mixture control having means connected thereto for varying the ratio of air and fuel supplied said engine cylinder according to said indication of the air pressure in the engine cylinder at said point in the compression stroke, said means being actuated by said air pressure received in said mixture control from the engine cylinder.

2. In a device of the character described, a mixture control for controlling the ratio of air and fuel supplied to an engine cylinder, a fuel injection pump for supplying fuel to said engine cylinder, means for controlling the air supplied to said engine cylinder, an air passage connecting said mixture control and said engine cylinder whereby an indication of the air pressure in the engine cylinder at a point in the compression stroke may be transmitted to said mixture control, means for varying the ratio of air and fuel supplied said engine cylinder and connected to said mixture control and a pressure actuated diaphragm in said mixture control and adapted to be actuated by said indication of air pressure from said engine cylinder, said means for controlling and varying the ratio of air and fuel supplied said engine cylinder being connected to and actuated by said diaphragm whereby said ratio of air and fuel may be varied according to air pressure in said engine cylinder at a point in the compression stroke.

3. In a device of the character described, a mixture control for controlling and varying the ratio of the air and fuel supplied to an engine cylinder, an air passage connecting said mixture control and said engine cylinder whereby an indication of the air pressure in the engine cylinder at a point in the compression stroke may be transmitted to said mixture control, a fuel injection pump, means connecting said injection pump and said engine cylinder for supplying fuel to said cylinder, control means for said injection pump and connected to said pump and to said mixture control and a pressure actuated member in said mixture control and adapted to be actuated by air pressure from said engine cylinder, said member being connected to said control means for the injection pump for controlling said injection pump according to air pressure in said engine cylinder at a point in the compression stroke.

4. In a device of the character described, a mixture control for controlling and varying the ratio of the air and fuel supplied to an engine cylinder, an air passage connecting said mixture control and said engine cylinder whereby an indication of the air pressure in the engine cylinder at a point in the compression stroke may be transmitted to said mixture control, a fuel injection pump, means connecting said injection pump and said engine cylinder for supplying fuel to said cylinder, control means for said injection pump and connected to said pump and to said mixture control and a pressure actuated diaphragm in said mixture control and adapted to be actuated by air pressure from said engine cylinder, said diaphragm being connected to said control means for the injection pump for controlling said injection pump according to air pressure in said engine cylinder at a point in the compression stroke.

5. In a device of the character described, a mixture control for controlling the ratio of the air and fuel supplied to an engine cylinder, an air passage connecting said mixture control and said engine cylinder whereby an indication of the air pressure in the engine cylinder at a point in the compression stroke may be transmitted to said mixture control, a fuel injection pump, means connecting said injection pump and said engine cylinder for supplying fuel to said cylinder, valve means for controlling the air supplied to said engine cylinder, control means for said valve means and connected to said mixture control and means in said mixture control and adapted to be actuated by air pressure from said engine cylinder and connected to said control means for controlling said valve means according to air pressure in said engine cylinder.

6. In a device of the character described, a mixture control for controlling the ratio of the air and fuel supplied to an engine cylinder, an air passage connecting said mixture control and said engine cylinder whereby an indication of the air pressure in the engine cylinder at a point in the compression stroke may be transmitted to said mixture control, a fuel injection pump, means connecting said injection pump and said engine cylinder for supplying fuel to said cylinder, valve means for controlling the air supplied to said engine cylinder, control means for said valve means and connected to said mixture control and a pressure actuated diaphragm in said mixture control and adapted to be actuated by air pressure from said engine cylinder and connected to said control means for controlling said valve means according to air pressure in said engine cylinder.

WILLIAM R. HOPKINS.

REFERENCES CITED

The following references are of record in the file of this patent:

UNITED STATES PATENTS

| Number | Name | Date |
|---|---|---|
| 998,463 | Butsch | July 18, 1911 |
| 1,117,641 | Cottle | Nov. 17, 1914 |
| 1,610,997 | Cafferata | Dec. 14, 1926 |
| 1,972,881 | Geisse | Sept. 11, 1934 |
| 2,004,869 | Hogg | June 11, 1935 |
| 2,413,111 | Malin | Dec. 24, 1946 |